Figure 1:
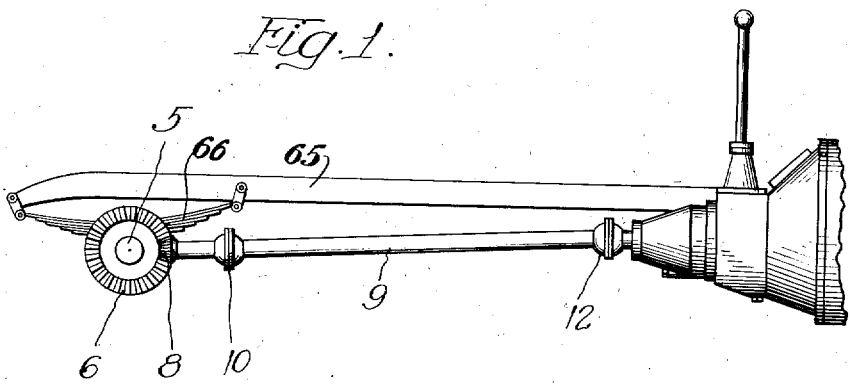

Oct. 18, 1932. T. L. FAWICK Re. 18,629

TRANSMISSION

Original Filed Feb. 26, 1923

Inventor:
Thomas L. Fawick.

By Brown, Jackson, Boettcher & Dienner

Attys.

Reissued Oct. 18, 1932 Re. 18,629

UNITED STATES PATENT OFFICE

THOMAS L. FAWICK, OF RACINE, WISCONSIN, ASSIGNOR TO BROWN-LIPE GEAR COMPANY, OF SYRACUSE, NEW YORK, A CORPORATION OF NEW YORK

TRANSMISSION

Original No. 1,524,476, dated January 27, 1925, Serial No. 621,455, filed February 26, 1923. Application for reissue filed December 3, 1926. Serial No. 152,509.

My invention relates to transmissions for automotive apparatus.

While the particular device which I shall describe hereinafter in connection with drawings is a transmission adapted for use in trucks, it is to be understood that it is not limited to such use but may be employed in all similar work for example, motor busses, tractors, locomotives.

In transmitting the drive from a gasoline engine to the rear wheels, or other driving wheels, it is necessary to reduce the speed of the driving wheels with respect to the crank shaft of the engine. Particularly in trucks a fairly high reduction in the drive is desirable, this reduction varying from about six to one to about twelve to one. These ratios are engine speed to rear axle or wheel speed in terms of angular motion.

So far there have been two general schemes of securing the desired speed reduction, first by driving directly through the gear box and making the speed reduction at the rear axle through means mounted in or suspended on the rear axle and second by having a speed reduction in the gear box in advance of the propeller shaft with perhaps a part of the speed reduction in the rear axle or parts mounted therein or thereon.

According to the first scheme above mentioned, that is speed reduction at the rear, the general types of mechanisms for securing this are; first to have a pinion and ring gear in the rear axle housing and suitable gearing to secure the desired gear reduction. Second to have a worm wheel and worm in the rear axle housing and third to have reduction gearing in the wheels themselves or at the wheels sometimes in addition to a reduction at the differential.

All of these schemes have the objection of putting additional weight on the rear axle or connected parts. This results in a high unsprung weight and is not suitable for higher speed over rough roads. The disadvantages of unsprung weight are so well known to engineers skilled in this art that no recapitulation of the same is necessary.

According to the second scheme above mentioned; namely of having the reduction in the gear box itself, as now practiced this is done in general by having two parallel shafts one a continuation of the engine shaft and the other a continuation of the propeller shaft, these two shafts lying parallel to each other and being connected by gears of varying ratios, these gears being external spur gears. The objection to this type of gear reduction is generally that it is noisy and results in considerable wear with consequent objectionable backlash and high cost of maintenance. Since the gear box is generally closely associated with the driver the noise is unusually objectionable. In addition this type of construction generally results in the propeller shaft extension being lower than the crank shaft extension with the result that oiling is not as satisfactory as it might be.

My invention relates to the second class of speed reduction; namely, in the gear box where the weight is a sprung weight and consequently least objectionable.

According to my invention I provide in connection with the usual gear box an additional reduction consisting of a spur pinion driven by an extension of the crank shaft and an internal gear consisting of an extension of the propeller shaft. While I have pointed out that the invention is particularly useful in connection with the ordinary gear box for securing various gear ratios for bringing the vehicle up to speed, it is to be understood that the invention is not limited to the interposition of a change speed gear box in its broader aspects.

The chief advantage of my invention is the ability to provide without adding additional unsprung weight or without taking up much space, a system of gear reduction which is quiet in operation, strong in action, peculiarly accessible and simple and one which is easily oiled in connection with the usual transmission gears and which assists in maintaining the bearings of the gear box well oiled and in proper operative condition.

Numerous advantages and adaptations of the invention will be apparent from the following detailed description of the preferred form of the invention.

In order to acquaint those skilled in the art with the manner of constructing and operating a device in accordance with my invention, I shall now describe in connection with the accompanying drawings, a preferred embodiment of same.

Figure 2:
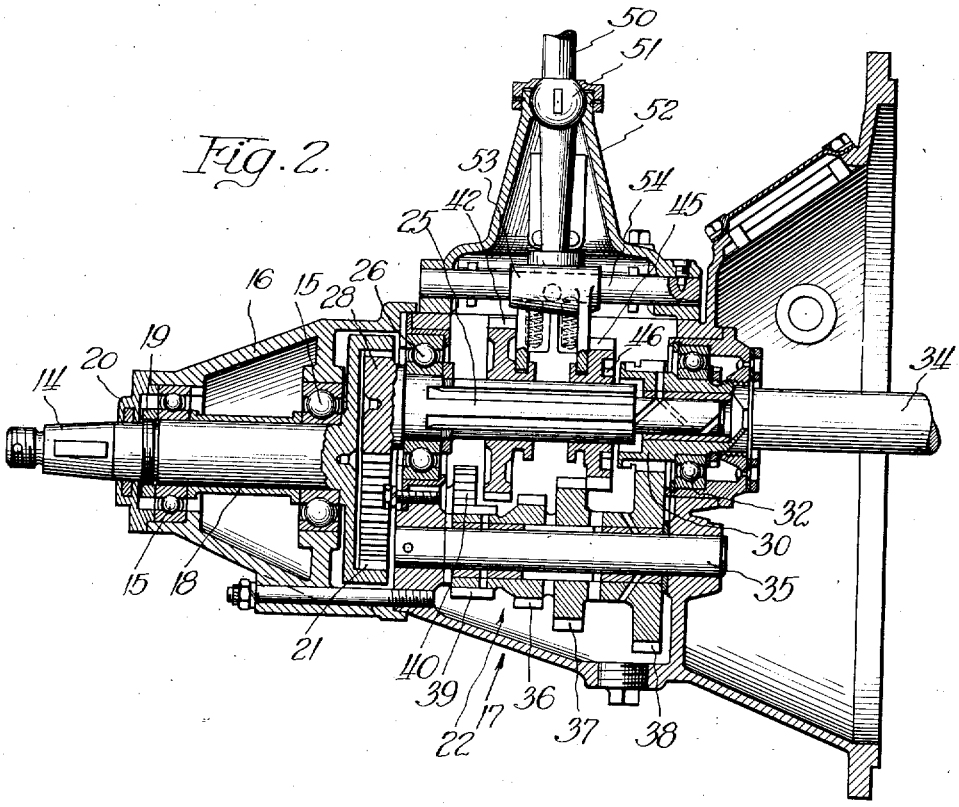

In the drawings:

Fig. 1 is a diagrammatic view illustrating the relation of the gear box embodying my invention, with the rear axle which co-operates therewith; and Fig. 2 is a vertical longitudinal section through the gear box shown in Fig. 1 showing an embodiment of my invention in connection therewith.

It is to be understood that by the employment of my transmission the rear axle may be made as small in diameter and as light in weight as is consistent with strength and satisfactory operating characteristics. I find it particularly desirable to keep the ratio between the ring gear and the driving pinion in the rear axle low and to this end I have illustrated a reduction of approximately 3 to 1. This permits of a compact and light rear axle construction with the ability to have a proper gear reduction secured to the transmission.

While I shall describe the invention in connection with securing a gear reduction it will be understood that the same principles cover the use of stepping up the speed by reversing the relation of the gears as I shall describe.

With reference now to the drawings, in the particular embodiment of the invention selected for illustration, 5 designates the rear drive axle of a motor vehicle having fixed thereon a bevel gear 6 which meshes with a bevel pinion 8 at the rear end of propeller shaft 9 encased in the usual tube as shown and provided with the usual flexible or universal joints 10 and 12 one arranged back near the rear axle and the other up near the change speed gear box in the particular embodiment shown. Bevel gear 6 and pinion 8 are proportioned to provide a speed reduction between the propeller shaft and axle 5 at this point. In the particular embodiment shown this reduction is approximately 3 to 1. This may of course be varied. The reduction at this point is however preferably confined to that secured through the inter-meshing gears 6 and 8 it being one of the features of my invention to eliminate additional reduction mechanism and to minimize the weight at this point.

The forward end of propeller shaft 9 has driving connection as through universal 12 with a driven shaft 14 rotatably mounted in bearings 15—15 arranged in a tubular extension 16 of the transmission gear box 17. The outer bearing is positioned between a sleeve 18 arranged on shaft 14 between bearings 15—15 and a nut 19 and cap screw or plug 20. The forward bearing or inner bearing is positioned between sleeve 18 and a shoulder at the forward end of shaft 14. The forward end of shaft 14 terminates in a relatively large internal gear 21 formed integral therewith in the particular embodiment shown and positioned for rotation in the tubular gear box extension 16.

The frame of the vehicle upon which the transmission gear box 17 is mounted is indicated at 65 in Figure 1, and this frame 65 is spring supported upon the rear axle by means of the spring 66, it being understood that this spring supporting arrangement for the frame usually is duplicated at each side of the vehicle, and may, of course, vary as desired.

The details of gear box 17 per se and the change speed mechanism encased therein and designated generally by reference character 22 may be varied within the scope of my invention. They form no part of the present invention except in combination therewith and in fact the invention is not in its broader aspects limited to the inter-position of a change speed gear box.

I will, however, describe the particular change speed device shown sufficiently to impart a clear understanding of my invention in connection therewith. It comprises a stub shaft 25 rotatably journaled at its rear end in a bearing 26 carried by casing 17. Rearwardly beyond bearing 26 shaft 25 terminates in an integral pinion 28 which meshes with the relatively large internal gear 21. The forward end of shaft 25 is rotatably journaled in the hub portion of a pinion 30 which pinion is in turn journaled in a bearing 32 carried by casing 17. Pinion 30 is driven from the engine or main drive shaft 34.

A counter-shaft 35 rotatably mounted at its opposite ends in suitable bearings carried by casing 17 is provided with gears 36, 37 and 38 of different sizes for changing the forward speed of the vehicle in the usual manner, and with a pinion 39 which meshes with an idler gear 40 to reverse the direction of movement of the vehicle when gear 42 splined or feathered on shaft 25 for longitudinal movement therealong is shifted into mesh with idler 40. Shifting of gear 42 forwardly into mesh with gear 36 gives low speed forward. A second gear 45 splined or feathered on shaft 25 for longitudinal movement therealong is adapted to be shifted into mesh with gear 37 to give second speed forward and is provided with a clutch socket 46 shaped like an internal gear for engagement with the rear portion of pinion 30 to connect the drive and stub shafts 34 and 25 for rotation together. The forward portion of pinion 30 is in constant mesh with gear 38 to impart rotation to the counter-shaft as well understood in the art. Gears 42 and 45 are shifted in any suitable or desired manner as by a lever 50 fulcrumed at 51 in tower 52 and adapted for shifting engagement at its lower end with the usual shifting members 53 on rods 54.

From the foregoing it will now be apparent that I permit the usual or any desired speed and direction changes from the main drive or engine shaft 8 to stub shaft 25 and that I provide an improved reduction connection to the driven shaft, specifically the propeller shaft in this instance. In the meshing of pinion 28 with the internal reduction gear 21 there is less relative tooth movement than there would be between two meshing spur gears because in moving into mesh the teeth of both said gears are rising or moving in the same direction as distinguished from a rise of the teeth of one and a downward movement of the teeth of the other as would be the case where two spur gears are employed.

Another advantage lies in the relatively great mesh secured between the pinion 28 and internal gear 21 as compared for example with the mesh that would be secured between two spur gears.

The resulting disposition of shaft 14 with its bearing 15 above counter-shaft 35 eliminates bearing openings at the counter-shaft and makes possible the maintenance of a fluid tight joint at least adjacent the counter-shaft so that the oil level may be maintained to a relatively high point. This insures good oiling of the various gears and bearings. The internal gear 21 carries the oil up and supplies it to pinion 28 and bearing 26, and the meshing gears 30 and 38 insure good oiling of bearing 32.

The improved speed reducing provision made regardless of the type of change speed gearing or whether it be employed with a change speed gearing at all is a highly important aspect of my invention. It may be otherwise embodied in the change speed gearing or it may be positioned at any other desired point and used in conjunction with or without a change speed mechanism as desired.

As already pointed out the internal gear and meshing pinion drive connection of my invention may be used without other change gears and in this connection provisions are contemplated for varying the driving ratio through the internal gear and meshing pinion as by mounting the same for relative movement and different driving connections. Provisions for driving through or around the internal gear and meshing pinion as well as for driving through said internal gear and meshing pinion directly or by way of the change gears are also contemplated.

I have described the invention in connection with the details of a particular embodiment, but I do not intend thereby to limit the invention to such details nor do I intend to be limited to the particular embodiment and relation of the essential features shown and described.

I claim:

1. In a transmission the combination of a drive shaft, a counter-shaft, an intermediate shaft and a driven shaft, said shafts being journaled to lie parallel to each other, changeable driving connections comprising selective pairs of meshing external gears between said first three shafts for changing the driving ratio, means for clutching the first and third shafts together for direct drive, a pinion on said third shaft and an internal gear on said driven shaft embracing and driven by said pinion to secure a gear reduction from the intermediate shaft to the driven shaft.

2. In combination, a gear box having a drive shaft, a stationary countershaft entirely at one side of the drive shaft and a stub shaft, a housing secured on the end of the gear box, bearings in said housing, a driven shaft in said bearings projecting into said housing, said stub shaft also projecting into said housing, one of the shafts which project into the housing having an internal gear, the other of said shafts which project into said housing having a pinion cooperating with said internal gear.

3. In a transmission, a gear box having end walls, a drive shaft having a bearing in one end wall said bearing supporting the drive shaft against radial and axial movement, a stub shaft concentric with the drive shaft having a bearing in the other end wall of the gear box and on said drive shaft, means for clutching the stub shaft to the drive shaft, said stub shaft extending through said other end wall and bearing a pinion thereupon, a countershaft and change speed external gears connecting said drive shaft and said stub shaft, a housing outside said second end wall secured to said box and enclosing said pinion, a driven shaft having bearings in said housing, and having an internal gear in said housing driven by said pinion.

4. In combination, a gear box, a drive shaft and a driven shaft extending from said box, an intermediate shaft in line with the drive shaft and adapted to be connected thereto through variable driving ratio mechanism, comprising a plurality of pairs of shiftable spur gears, a pinion on said intermediate shaft and an internal gear driven by the pinion, said latter gear being mounted on said driven shaft.

5. In a transmission, a drive shaft, a pinion shaft axially in line with the drive shaft, a pinion on the outer end of said pinion shaft, clutch means for clutching the other end of the pinion shaft and the drive shaft together, other means for connecting said shafts through a variable driving ratio comprising a lay shaft bearing external gears, and a driven shaft parallel to said pinion shaft and having a fixed internal gear constantly in mesh with the pinion on the pinion shaft.

6. In a transmission, a drive shaft, a parallel driven shaft, a pair of intermediate shafts one of said intermediate shafts lying in line with the drive shaft and having a pinion, an internal gear fixed on the driven shaft and driven by the pinion, and means for changing the driving ratio between said drive shaft and the pinion, the axis of the driven shaft being below the axis of the drive shaft.

7. In combination, a housing, a drive shaft and a driven shaft extending out of the housing, an intermediate shaft disposed within the housing, said driven shaft having an internal gear within the housing and said intermediate shaft having a pinion driving said internal gear and change speed gears between said drive shaft and said intermediate shaft, the drive from the drive shaft to the driven shaft always passing through said pinion.

8. A transmission comprising a gear box having four transverse walls, a driven shaft having bearings in walls 1 and 2, an internal ring gear mounted on said shaft between the walls 2 and 3, a drive shaft having a bearing in wall 4, an intermediate shaft mounted in walls 3 and 4 and having a pinion extending into the space between walls 3 and 2 and driving said internal gear, and change speed gears for connecting the drive shaft with the intermediate shaft, said change speed gears being disposed in the space between walls 3 and 4.

9. In a transmission, a gear case having a drive shaft extending from one end thereof, a driven shaft extending from the other end thereof, said case having two compartments, selective change speed gearing comprising shiftable spur gears mounted in one compartment and speed reducing gearing mounted in the other compartment, said speed reducing gearing including an internal gear mounted on the inner end of the driven shaft and a pinion cooperating therewith and driven through said change speed gearing by the drive shaft.

10. In a motor vehicle, a drive axle having a drive wheel, a gear box remote from said wheel and axle, said gear box comprising two sets of gears therein, one set being selective change spur gears for varying the driving ratio and direction, and the other set comprising an internal gear and a pinion cooperating therewith, the drive to said axle always extending through said pinion.

11. In a transmission, a gear box, a drive shaft, selective change gear mechanism in the gear box comprising shiftable spur gears, a driven shaft, an internal gear and co-operating spur pinion between said selective change gear mechanism and said driven shaft, and a housing secured to one wall of the gear box forming a gear box for the internal gear and pinion, and bearings for supporting the driven shaft in said housing.

12. In a transmission, a gear box having a drive shaft and a stub shaft projecting out of the same, change speed mechanism comprising shiftable spur gears housed in the box, a driven shaft, a supplementary housing secured on the end of the box to enclose the end of the stub shaft and the end of the driven shaft, and gearing in said housing comprising an internal gear keyed on one of said shafts and a co-operating pinion on the other shaft.

13. In a transmission, the combination of a drive shaft, change speed means, and a driven shaft, said driven shaft having an internal gear secured against rotative movement thereupon, and a pinion cooperating with said internal gear and being driven from the drive shaft, the drive from the drive shaft to the driven shaft invariably being transmitted by and through said pinion.

14. In a transmission, the combination of a drive shaft, change speed means, a driven shaft, and a speed reduction connection between the drive and driven shafts comprising an internal gear keyed upon one of said shafts, and a co-operating pinion meshing with the internal gear and driven from the other shaft, the drive from the drive shaft to the driven shaft invariably being transmitted by and through said pinion.

15. In combination, a driving shaft, an intermediate shaft and a driven shaft, change speed and reversing gearing between the driving shaft and the intermediate shaft including a plurality of pairs of cooperating external spur gears and means of coupling the driving and intermediate shafts together, a pair of gears forming a connection between the intermediate shaft and the driven shaft comprising a spur pinion and an internal gear.

16. In combination, a driving shaft, an intermediate driven shaft, ratio and direction changing gear mechanism between said shafts including a plurality of pairs of co-operating external spur gears and a gear box for aforesaid parts, a supplementary gear box rigidly connected to said gear box, a driven shaft supported in said supplementary gear box, a pinion for the intermediate shaft and an internal gear for the driven shaft.

17. In an automotive vehicle having a spring supported frame, a shaft driven at engine speed, a propeller shaft, and a transmission mounted on said frame between said shafts and having a lay shaft and selective pairs of external spur gears for transmitting motion from one shaft to the other, said transmission including ratio and direction changing elements and comprising an internal gear and driving pinion as one of the ratio changing elements, said pinion being in alignment with the first shaft and being capable of being driven at engine speed.

18. In an automotive vehicle, a shaft driven at engine speed, a propeller shaft, and a transmission mounted between said shafts for transmitting motion from one shaft to the other, said transmission comprising ratio and direction changing elements comprising a lay shaft bearing a plurality of rigidly connected external spur gears and including an internal gear member and pinion member in constant mesh.

19. In an automotive vehicle, a shaft driven at engine speed, a propeller shaft, and a transmission mounted between said shafts for transmitting motion from one shaft to the other, said transmission comprising ratio and direction changing elements comprising a lay shaft bearing a plurality of rigidly connected external spur gears including an internal gear member and pinion member in constant mesh, one of said members being in alignment with said first shaft.

20. In an automotive vehicle, a shaft driven at engine speed, a propeller shaft, and a transmission mounted between said shafts for transmitting motion from one shaft to the other, said transmission comprising axially shiftable ratio and direction changing gear elements and including an internal gear member and pinion member in constant mesh, one of said members being in alignment with said first shaft.

21. In an automotive vehicle, a shaft driven at engine speed, a propeller shaft, and a transmission mounted between said shafts for transmitting motion from one shaft to the other, said transmission comprising axially shiftable spur gears disposed in alignment with said first shaft, a counter shaft, gears on said counter shaft co-operable with said shiftable gears, a pinion disposed in alignment with said first shaft and being capable of being driven at engine speed, and an internal gear co-operable with said pinion and driving the propeller shaft.

22. In a transmission of the automobile type adapted to be mounted above the chassis springs, the combination of a driven shaft adapted to be substantially in line with the engine shaft and to be driven at engine speed, selective direction and ratio changing mechanism comprising a stationary lay shaft and spur gears, and comprising a pinion mounted axially in line with the drive shaft and adapted to be driven at engine speed, and an internal gear member driven by said pinion, and a drive member adapted to be connected to the propeller shaft of the vehicle, and driven by said internal gear member.

23. In an automobile transmission disposed between the engine shaft and the propeller shaft of a vehicle for transmitting motion between them, the combination of a drive shaft section adapted to be connected to the engine shaft, a driven shaft section adapted to be connected to the propeller shaft, selective longitudinally shiftable change speed gears between said shaft sections for accelerating the vehicle, and an internal gear reduction in the transmission comprising a pinion axially in alignment with the drive shaft and adapted to be driven by the drive shaft, and an internal gear driven by the pinion and connected to the propeller shaft, said selective change speed gears having a lay shaft mounted in a fixed position below the drive shaft section and the driven shaft section.

24. In a transmission for a motor vehicle, the combination of a drive shaft, driven at engine speed, said shaft bearing a low speed pinion, a lay shaft bearing a low speed gear in constant mesh with the low speed pinion, a driven shaft adapted to be driven during continuous drive of the vehicle at less than engine speed, pinions on the lay shaft and axially shiftable gears adapted to be selectively meshed with said latter pinions for acceleration of the vehicle, and an internal gear reduction for continuous drive of the vehicle comprising a pinion adapted to be clutched directly to the drive shaft and an internal gear fixed on the driven shaft, said gear being driven through said latter pinion.

25. In a transmission for a motor vehicle, the combination of a drive shaft adapted to be driven at engine speed, a lay shaft having a low speed gear, a low speed pinion in constant mesh therewith, said pinion being axially in alignment with the driving shaft, selective second and third speed spur gears on the lay shaft rotating always at the same speed as the low speed gear, an intermediate shaft and a driven shaft both of said latter shafts being parallel to the lay shaft and one of said latter shafts being in axial alignment with the drive shaft and the other of said latter shafts being out of alignment with the drive shaft, and an internal gear and cooperating pinion employed for a normal running drive of the vehicle and connected one to the intermediate shaft and one to the driven shaft.

26. In an automotive vehicle having an engine, a frame, an axle shaft and a propeller shaft connected by bevel gear and pinion, the combination of a first shaft driven at engine speed, a second shaft comprising a lay shaft parallel to the first shaft, a third shaft comprising an intermediate shaft parallel to the lay shaft, and a fourth shaft connected directly to the propeller shaft, means for clutching the first shaft directly to one of said other shafts, a series of shiftable spur gears driven by said first shaft and driving through the lay shaft to one of said other shafts for providing three forward speeds and reverse, and an internal gear and pinion for providing a quiet drive at a gear reduction between the first shaft and the last shaft through one of said other shafts.

27. In an automotive vehicle having a frame and a driving engine, the combination of a rear axle drive comprising an axle shaft, a bevel gear connected to said axle shaft, a bevel pinion in fixed mesh therewith, a propeller shaft for said pinion, said gear and pinion providing a gear ratio lower than standard practice, a transmission mounted on the vehicle frame and connected between said engine and propeller shaft and comprising a first shaft driven by the motor at motor speed, a second shaft disposed in end to end relation to the first shaft, a third shaft lying parallel to the first and second shafts, a fourth shaft connected to the propeller shaft, shiftable spur gear connections between the third shaft and a plurality of the other shafts, and a gear reduction employed in normal drive of the vehicle comprising a pinion connected to and driven by the first shaft at motor speed, and a meshing internal gear driven by said pinion and driving the fourth shaft to provide a part of the reduction between the engine shaft and the axle shaft.

28. In a transmission, a drive shaft and an intermediate shaft in axial alignment, a driven shaft, a lay shaft parallel to and disposed entirely at one side of said drive shaft and said intermediate shaft, a fixed pinion on the drive shaft, a fixed spur gear on the lay shaft meshing with the pinion, change gears between the lay shaft and one of said other shafts, a spur pinion on the intermediate shaft, and an internal gear connected to the driven shaft and being in mesh with said spur pinion.

29. In combination, an automobile having a frame, a driving motor, a rear axle, and a propeller shaft, a transmission on the frame for connecting said motor and said rear axle comprising two sets of gears, one of said sets of gears comprising a plurality of sets of shiftable spur gears for acceleration and reverse, the other set comprising an internal gear reduction for a quiet running drive at reduced speed of the propeller shaft with respect to the motor shaft, clutch means for cutting out the operation of said accelerating and reverse gears and driving directly through to the driving pinion of said internal gear reduction.

30. In combination, in an automobile having a motor, a motor shaft and a propeller shaft, a compound transmission between said shafts comprising two sets of gears for different purposes, one set of gears being accelerating and reverse gears for accelerating and maneuvering the vehicle and to be used for temporary drive purposes, the other set being used for continuous drive of the vehicle, the first set comprising pairs of external spur gears, certain ones of which are selectively meshed by bodily endwise movement thereof, said external pairs being inherently relatively noisy, the second set comprising internal gear drive only and being inherently quiet, and clutch means for cutting out the operation of the spur gear transmission and leaving the internal gear drive in operation between the motor shaft and the propeller shaft for continuous drive.

In witness whereof, I hereunto subscribe my name, this 20th day of November, 1926.

THOMAS L. FAWICK.